United States Patent
Bögl

(10) Patent No.: US 11,483,063 B2
(45) Date of Patent: Oct. 25, 2022

(54) METHOD AND SYSTEM FOR PROVIDING AIR TRAFFIC CONTROL WITHIN A GEOGRAPHIC SECTOR

(71) Applicant: Rohde & Schwarz GmbH & Co. KG, Munich (DE)

(72) Inventor: Thomas Bögl, Augsburg (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 16/910,195

(22) Filed: Jun. 24, 2020

(65) Prior Publication Data
US 2020/0403692 A1   Dec. 24, 2020

(30) Foreign Application Priority Data
Jun. 24, 2019  (EP) .................................. 19182045

(51) Int. Cl.
| | |
|---|---|
| G08G 5/00 | (2006.01) |
| H04B 7/185 | (2006.01) |
| H04W 84/06 | (2009.01) |
| H01Q 1/28 | (2006.01) |
| H01Q 19/12 | (2006.01) |
| H01Q 19/30 | (2006.01) |
| H04B 7/19 | (2006.01) |

(52) U.S. Cl.
CPC ....... *H04B 7/18519* (2013.01); *G08G 5/0004* (2013.01); *H01Q 1/288* (2013.01); *H01Q 19/12* (2013.01); *H01Q 19/30* (2013.01); *H04B 7/18513* (2013.01); *H04B 7/19* (2013.01)

(58) Field of Classification Search
CPC ............... H04B 7/185; H04B 7/18506; H04B 7/18508; H04B 7/18521; H04B 7/18526; H04B 7/1853; H01Q 1/28; H01Q 1/288; H01Q 19/12; H01Q 19/30; G08G 5/0004; H04W 84/06
See application file for complete search history.

(56) References Cited

U.S. PATENT DOCUMENTS

| | | | | |
|---|---|---|---|---|
| 5,963,846 A | * | 10/1999 | Kurby ................ | H04B 7/18567 455/12.1 |
| 6,044,323 A | * | 3/2000 | Yee .................... | H04B 7/18508 701/13 |

(Continued)

FOREIGN PATENT DOCUMENTS

| | | | | |
|---|---|---|---|---|
| CA | 2720239 A1 | * | 12/2009 | ......... H04B 7/18506 |
| CA | 2829817 A1 | * | 9/2012 | ........... G08G 5/0013 |

(Continued)

OTHER PUBLICATIONS

EPO as ISA, "Extended European Search Report", EP19182045.5, dated Dec. 6, 2019, European Patent Office.

*Primary Examiner* — Blane J Jackson
(74) *Attorney, Agent, or Firm* — Intrinsic Law Corp.

(57) ABSTRACT

A system for providing air traffic control within a geographic sector to which a communication frequency in the VHF or UHF range is assigned comprises at least one satellite configured for a communication with an aircraft in the geographic sector using an analog modulated RFF signal at the communication frequency. The system is configured in such a way that at each time, only one satellite is actively transmitting on the communication frequency assigned to the geographic sector.

10 Claims, 6 Drawing Sheets

(56) References Cited

U.S. PATENT DOCUMENTS

| | | | |
|---|---|---|---|
| 9,356,686 B1* | 5/2016 | Mitchell | H04B 7/18519 |
| 9,819,410 B1* | 11/2017 | Azevedo | H04B 7/18508 |
| 10,374,692 B1* | 8/2019 | Banerian | H04B 7/18508 |
| 10,911,132 B2* | 2/2021 | Alminde | H04B 7/1851 |
| 2013/0115874 A1 | 5/2013 | Barthere et al. | |
| 2014/0218242 A1* | 8/2014 | Platzer | G01S 5/0027 |
| | | | 342/454 |
| 2018/0040951 A1* | 2/2018 | Uchiyama | H01Q 1/125 |
| 2018/0337449 A1* | 11/2018 | Runyon | H01Q 3/04 |
| 2020/0343968 A1* | 10/2020 | Liu | H04B 7/18554 |

FOREIGN PATENT DOCUMENTS

| | | |
|---|---|---|
| EP | 2602778 A1 | 6/2013 |
| WO | 1996016489 A1 | 5/1996 |

\* cited by examiner

METHOD AND SYSTEM FOR PROVIDING AIR TRAFFIC CONTROL WITHIN A GEOGRAPHIC SECTOR

CROSS-REFERENCE TO RELATED APPLICATIONS

This application claims priority to European Patent Application No. 19182045.5, titled "Method and System for Providing Air Traffic Control Within a Geographic Sector," filed on Jun. 24, 2019, which is hereby incorporated by reference.

TECHNICAL FIELD

The present invention relates to a method and a system for providing air traffic control within a geographic sector, and especially to a method and a system using satellites for providing space-based air traffic control.

BACKGROUND

Air traffic control (ATC) is a service provided by air traffic controllers to the pilots of aircrafts by directing aircrafts and providing support and information. For this purpose, the earth's airspace is divided into flight information regions (FIR) by the International Civil Aviation Organization (ICAO). Each of these flight information regions is serviced by an area control center (ACC), also known as air route traffic control center. A flight information region generally comprises the airspace above a territory of a state in which the area control center is located, or a part thereof. It may also comprise an airspace above international waters. A flight information region may further be divided into sectors.

ATC systems are based on an analog communication between ground stations and aircrafts in the VHF or UHF range. Therein, an analog amplitude modulation of the RF carriers is used. To each sector of a flight information region, a specific frequency is assigned.

For international waters, it may happen that a sector of a flight information region cannot be covered by ground stations located in the state which is responsible for the flight information region or cannot be covered by ground stations at all. In this case all airplanes must be additionally equipped with a special long-range communication equipment. This long-range communication equipment may use either HF (shortwave) installations or satellites. In both cases these long-range communication systems are not using the VHF frequency band and must be available in parallel to the normal VHF equipment.

SUMMARY

It is therefore an object of the present invention to provide a method and a system for providing air traffic control from satellites into a geographic sector by using the standard VHF or UHF equipment but no extra expensive long-range communication equipment inside the aircrafts.

The foregoing and other objects are achieved by the features of the independent claims. Further implementation forms are apparent from the dependent claims, the description, and the figures. Therein, the product claims may also be further restricted by the features of the dependent method claims and vice versa.

According to a first aspect, a system is provided for providing air traffic control within a geographic sector (e.g., 102, 202) to which a communication frequency in the VHF or UHF range is assigned. The system comprises at least one satellite configured for a communication with an aircraft in the geographic sector using an analog modulated RF signal at the communication frequency. The system is configured in such a way that at each time, only one satellite is transmitting on the communication frequency assigned to the geographic sector.

The geographic sector may for example be a flight information region as defined by the ICAO or one of its sectors. VHF and UHF are frequency ranges internationally standardized by the International Telecommunication Union (ITU). For civilian aeronautical radio navigation service and aeronautical mobile radio communication service a frequency range from 108 to 137 MHz is reserved so that the system preferably operates within that frequency range. For military users, frequencies in the VHF band between 137 and 144 MHz or in the UHF band between 225 and 400 MHz are used. In general the system described herein can provide services from space into a geographical area by using analog modulated RF signals.

In an implementation form of the first aspect, the system comprises a plurality of satellites moving in a distance from each other essentially in the same orbit which is a medium earth orbit or low earth orbit, preferably an equatorial orbit.

In a further implementation form of the first aspect, the system is configured in such a way that one of the plurality of satellites is switched active for the communication with the aircraft when it reaches a predetermined position, and the satellite active up to then is switched off at the same time. The active role of a satellite in this context means the transmission of signals with the analogue RF signal into the geographical area. All other RF links and all other transmit and receive functions may active at all time for all satellites.

In a further implementation form of the first aspect, a number and an altitude of the plurality of satellites is selected in such a way that at each time, at least one of the plurality of satellites has an elevation within a predetermined range, preferably between 10° and 80°.

In a further implementation form of the first aspect, a number and an altitude of the plurality of satellites is selected in such a way that at each time, at least two of the plurality of satellites has an elevation within a predetermined range, preferably between 10° and 80°, so that one of them can be used as the active satellite and the other one can be used as a backup satellite if the active satellite fails.

In a further implementation form of the first aspect, a number and an altitude of the plurality of satellites is selected in such a way that for two geographic sectors at a sufficient distance from the equator resulting in an elevation of the satellites always being smaller than a predetermined upper limit, preferably 80°, so that a first satellite may be used as an active satellite for one of the geographic sectors, a second satellite may be used as an active satellite for the other one of the geo-graphic sectors, and a third satellite may be used as a backup satellite if one of the first and second satellites fail.

In a further implementation form of the first aspect, the system comprises at least two ground antennas following the position of at least two satellites. A supporting link between ground antennas and an actively transmitting satellite may provide relayed upwards and/or downwards ATC voice transmission and preferably embedded telemonitoring and telecommand functionality. A supporting link between a ground antennas and a not actively transmitting satellite may provide maintenance service, preferably orbit tracking, orbit correction, software upload and others.

In a further implementation form of the first aspect, the system is configured in such a way that each satellite can be switched active more than once during one orbit around the earth in order to provide air traffic control to more than one geographic sector. Preferably, each satellite is configured to swivel its antenna in order to reach geographic sectors at different distances from the equator.

In a further implementation form of the first aspect, the system comprises a satellite arranged at a geostationary orbit.

In a further implementation form of the first aspect, the satellite comprises a directional antenna for the VHF or UHF range.

In a further implementation form of the first aspect, the directional antenna comprises an active antenna and a passive reflector antenna. The active antenna preferably is a Yagi antenna. The reflector antenna preferably is a parabolic offset reflector antenna, in a further preferred way a deployable mesh antenna.

In a further implementation form of the first aspect, the satellite is configured to emit a linearly polarized VHF or UHF signal.

In a further implementation form of the first aspect, at least one satellite, preferably all the satellites is or are configured to be able to operate at least at two different communication frequencies assigned to one or different geographic sectors or at least at a communication frequency assigned to a geo-graphic sector and at an aircraft emergency frequency.

According to a second aspect, a communication method is provided for providing air traffic control within a geographic sector to which a communication frequency in the VHF or UHF range is assigned. The method comprises establishing a communication link using an analog modulated RF signal at the communication frequency between at least one satellite and an aircraft in the geographic sector, wherein at each time, only one satellite is actively transmitting on the communication frequency assigned to the geographic sector.

According to a third aspect, a satellite is provided. The satellite is configured for a communication using an analog modulated RF signal. The satellite further is configured to be used in a system according to the first aspects and/or its implementation forms or in a method according to the second aspect.

It is to be understood that an embodiment of the invention can also be any combination of the dependent claims or above implementation forms with the respective or other independent claims or above aspects.

Further features and useful aspects of the invention can be found in the description of exemplary embodiments with reference to the attached drawings.

BRIEF DESCRIPTION OF THE DRAWINGS

For a fuller understanding of the nature and advantages of the present technology, reference is made to the following detailed description of preferred embodiments and the accompanying drawings.

DETAILED DESCRIPTION

In the following, embodiments of the present invention are described with reference to the enclosed drawings.

Figure 1:
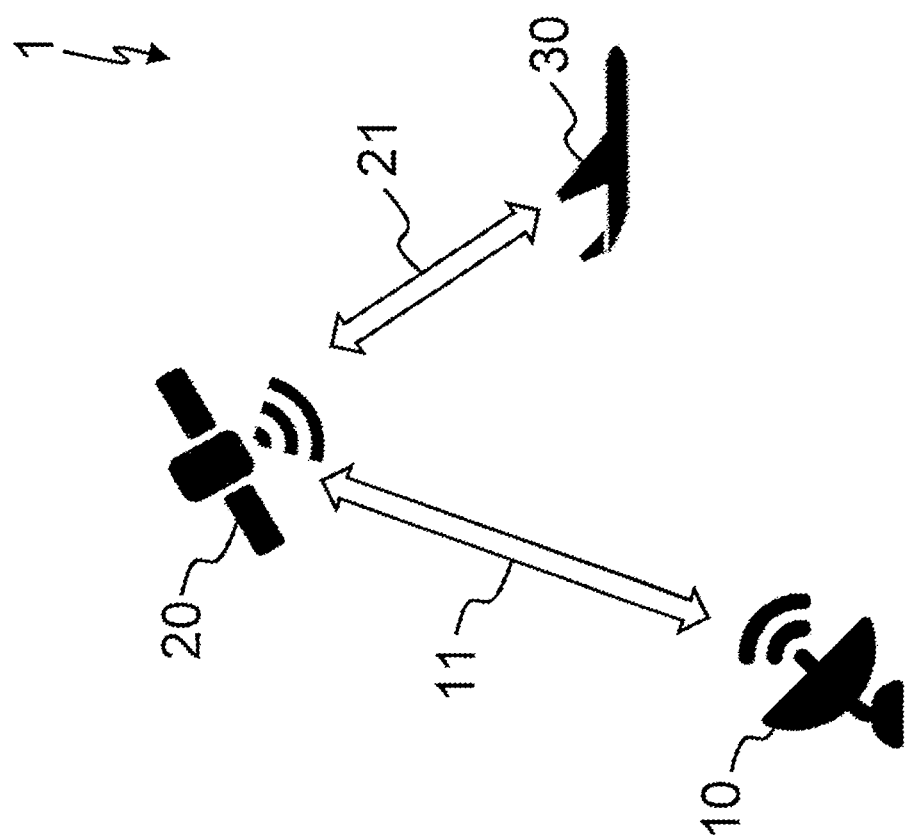
FIG. 1 shows a schematic view of an air traffic control system illustrating the basic principle of the present invention.

FIG. 1 shows a schematic view of an air traffic control system illustrating the basic principle of the present invention.

A system 1 for providing a traffic control in a flight information region comprises one or multiple ground station(s) 10 and one or multiple satellite(s) 20. A supporting link 11 (described later) is established between the ground station 10 and the satellite 20. A communication link 21 is established between the satellite 20 and an aircraft 30, for example an airplane. Both the supporting link 11 and the communication link 21 preferably are bidirectional. Thus, communication between the ground station 10 and the aircraft 30 is not performed as usual by a direct communication link between the ground station and the aircraft, but indirectly by the supporting link 11 between the ground station 10 and the satellite 20 and the communication link 21 between the satellite 20 and the aircraft 30.

The communication link 21 between the satellite 20 and the aircraft 30 has to fulfil a number of basic conditions because it is required to work with the existing ATC devices installed in aircrafts. That means that there are some unchangeable parameters such as the communication in the VHF and UHF range, especially in a frequency range of about 100 to 400 MHz (corresponding to a wavelength between 0.75 and 3 m) assigned to air traffic control, and the analog amplitude modulation used for air traffic control. For such analog waveforms, there are no automatic channel access mechanisms. Further, the number, the orbits, and the distances of the satellites are required to be selected in such a way that at each time, at least one satellite is visible from the aircraft.

In order to ensure a safe and easy to operate 24 hours/7 days communication between the satellite and the aircraft, the system 1 according to the present invention is configured in such a way that a single satellite covers a specific geographic sector at least over a reasonable long period of time, and that only one satellite is actively transmitting at each time point. Further, only a single frequency is used for the communication link 21 between the satellite and the aircraft within the specific geographic sector so that frequency switching within this sector is not required. Two specific embodiments of a system configured in this way are described below.

Figure 2:
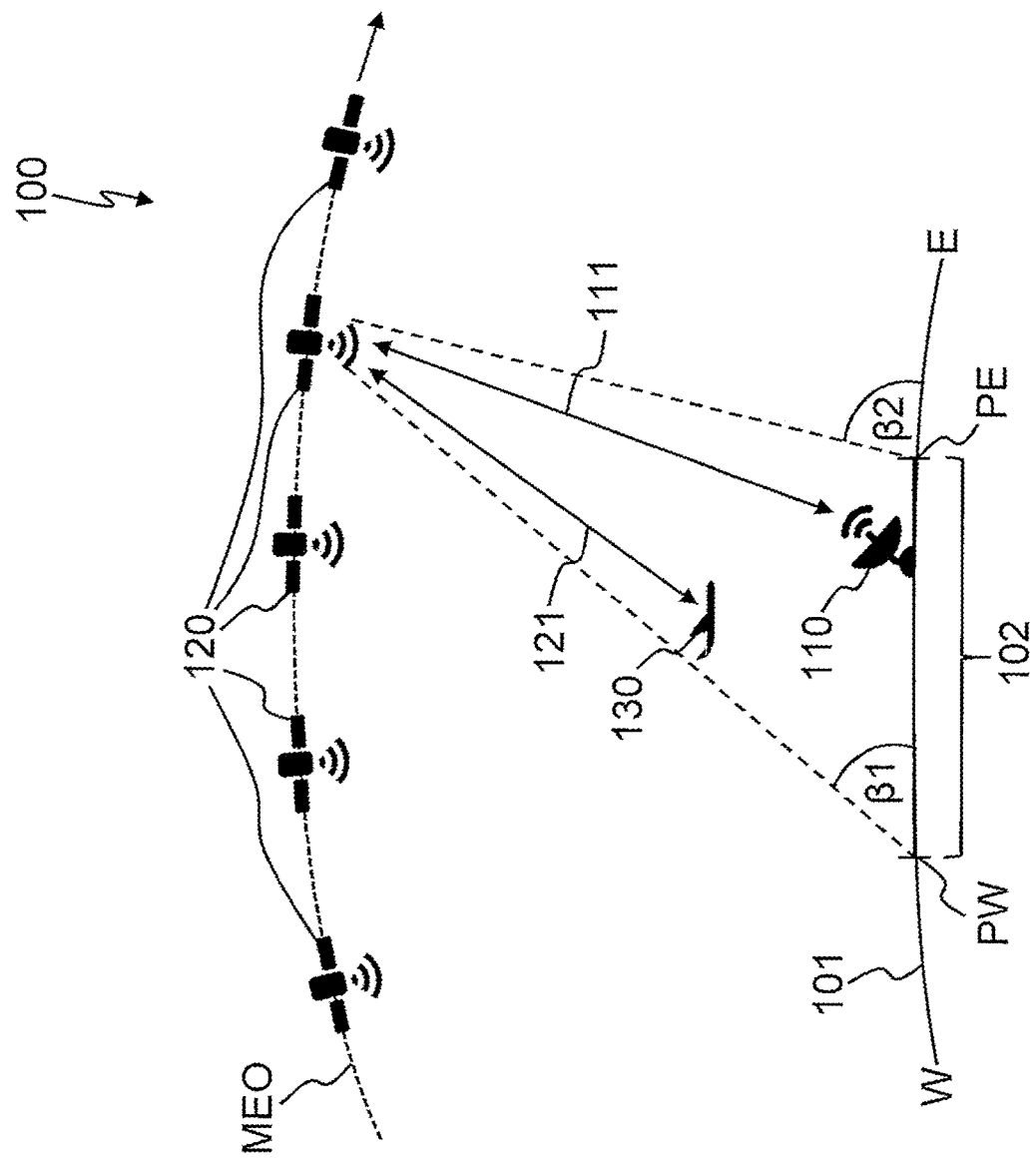
FIG. 2 shows a schematic view of an air traffic control system according to a first embodiment of the present invention.

In a first embodiment, a plurality of satellites are arranged in a line at a medium earth orbit (MEO) or low earth orbit (LEO), preferably above the equator. MEO includes an altitude range above earth from 2,000 km up to the geosynchronous orbit at 35,786 km while LEO is located below 2000 km FIG. 2 shows a schematic not-to-scale side view of an air traffic control system 100 according to the first embodiment. On the earth's surface 101, a geographic sector 102 is defined. This may for example be a flight information region or a sector thereof. A plurality of satellites 120 travels one behind the other at the predetermined altitude above the earth's surface 101, preferably above the equator, from west W to east E. A supporting link 111 is established between a ground station 110 and at least one of the satellites 120. A communication link 121 is established between the satellite 120 and an aircraft 130 in the geographic sector 102.

In order to ensure a safe line-of-sight communication link 121 between one of the satellites 120 and the aircraft 130 in the entire geographic sector 102, an elevation angle β of a position of the satellite 120 above the horizon has to be in a specific range, for example between 10° and 80°, for all the locations within the geographic sector 102. The upper limit is due to the fact that a radiation pattern of an aircraft has a minimum at a radiation angle of 90°. The lower limit is due to the fact that a minimum height of the satellite above the horizon is required for a safe communication link. In the figure, an elevation angle β1 for the westernmost point PW of the geographic sector 102 and an elevation angle β2 for the easternmost point PE are shown.

From this condition, the time each satellite 120 is available for communication can be determined depending on the altitude of the satellite. This time should not be too short in order to enable a reasonable long period of time for the operation of each satellite 120 and thus for a communication between an aircraft 130 and the corresponding satellite 120.

As a specific (non-limiting) example, a satellite at an altitude of 4,000 km which is within the MEO range has an orbit period of 175 minutes. If 16 satellites are distributed in equal distances at above the equator orbit, every 10.9 minutes a satellite is at a position the preceding satellite had before, so that the satellites may be used for communication one after the other over a time period of 10.9 minutes for each satellite (in this example the rotation of the earth is not taken into consideration).

Figure 3:
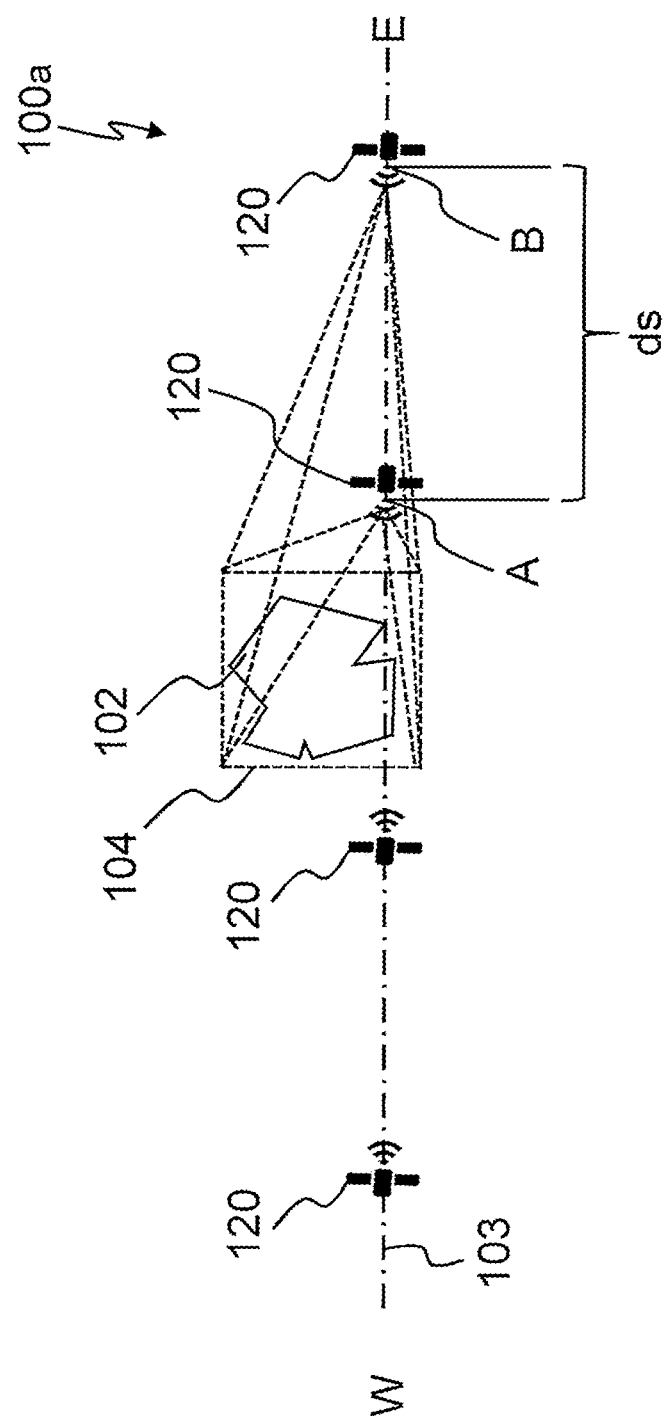
FIG. 3 shows a schematic view of an air traffic control system according to the first embodiment from above.

FIG. 3 shows a schematic view of an example 100a for the air traffic control system of the first embodiment from above. As a specific (non-limiting) example, the geographic sector 102 in this example extends across the equator 103.

A geographic sector 102 to be serviced, e.g. a flight information region or a sector thereof as defined by the ICAO, generally has an irregular shape. A service region 104 serviced by the satellite 120, for example a region in which the signal emitted by the satellite exceeds a predetermined power density, is selected in such a way that the entire geographic sector 102 is included. The fact that also adjacent sectors may thereby be covered by a service region 104 is not of relevance since other communication frequencies are assigned to these sectors.

The form of the service region 104 depends on the directivity of the satellite's antenna. Typically, helical antennas emitting a circularly polarized signal are used. This makes the communication less dependent on the relative position of satellite and aircraft with regard to each other. Linear polarization is also usable. For the ease of explanation, the service region 104 is shown as a rectangle, but the present invention is not limited thereto.

The satellites 120 at MEO travel above the equator 103 from west W to east E. A satellite directly passing across the geographic sector 102 has an elevation angle up to 90° which may be too high for a reliable communication. However, a satellite approaching the geographic sector 102 as well as a satellite having already passed the geographic sector 102 may be used for a reliable communication. In the following, especially the satellite positions A and B shall be taken into account.

Satellite position A is a position in which the satellite 120 has already passed the geographic sector 102 and is sufficiently far away from it so that its elevation angle within the entire geographic sector 102 is smaller than the maximum permissible elevation angle. On the other hand, satellite position B is a position in which the satellite 120 that has already passed position A still is near enough to the geographic sector 102 so that its elevation angle within the entire geographic sector 102 is greater than the minimum required elevation angle. A satellite in position A as well as a satellite in position B therefore can both be used for a communication with aircrafts in the geographic sector 102.

A distance ds between adjacent satellites 120 is selected in such a way that it is possible to find satellite positions A and B having the distance ds which fulfill the above conditions. The following timing scheme can then be used:

When a satellite 120 reaches position A, its communication link is switched on. It can then service the entire geographic sector 102 until it reaches position B. At the time it reaches position B, the following satellite 120 reaches position A. At this time, the communication link of the satellite at position B is switched off, and the communication link of the satellite which now is at position A is switched on. This is repeated every time the active satellite reaches position B.

In this way, it can be made sure that only one communication link at a time is switched on. Thereby, problems occurring in ATC by interference when two or more satellite transmitters are simultaneously active on the same frequency, such as a different Doppler shifts or different signal delays, can be avoided. Even if these problems may also be overcome by using a different VHF or UHF frequency for each satellite, the aircrafts in that case would not know when to switch between those frequencies.

With a system according to the present embodiment, is thus possible to provide space-based ATC via satellites 24 hours/7 days in the same way as ground-based ATC without requiring any additional equipment in the aircrafts and without having to modify the existing equipment and/or the procedures used. Further, it is possible to control the ATC for an entire geographic sector from a single ground station so that the use of ground stations of other states or the building of platforms for ground stations on sea is not required for providing ATC above international waters.

Figure 4:
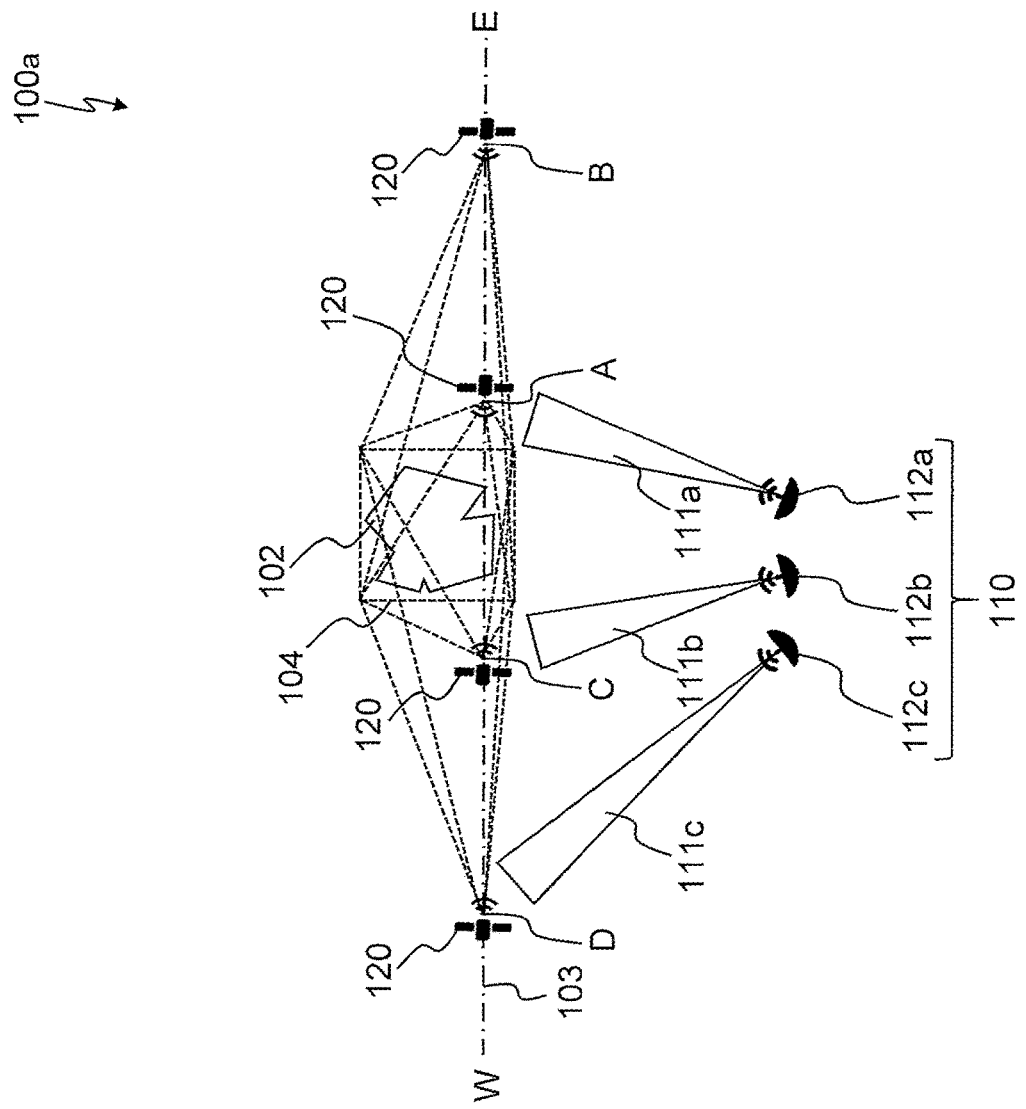
FIG. 4 shows additional satellite positions that may be used for communication.

FIG. 4 shows additional satellite positions that may be used for communication. As indicated above, positions before the satellite has reached the geographic sector 102 as well as positions after the satellite has passed the geographic sector 102 may be used for communication.

Satellite position C is a position in which the satellite 120 still is approaching the geographic sector 102 and is sufficiently far away from it that its elevation angle within the entire geographic sector 102 is smaller than the maximum permissible elevation angle. On the other hand, satellite position D is a position in which the satellite 120 approaching position C still is near enough to the geographic sector 102 that its elevation angle within the entire geographic sector 102 is greater than the minimum required elevation angle. A satellite in position C as well as a satellite in position D therefore can both be used for a communication with aircrafts in the geographic sector 102.

As an alternative to the above time scheming, the communication link of a satellite may be switched on when the satellite 120 reaches position D, and switched off when the satellite 120 reaches position C.

This redundancy also makes it possible provide the system with a failover. For the explanation, a case is assumed in which a satellite is active between the positions A and B. When this satellite fails, a satellite which currently is between the positions D and C may take over the operation, thus replacing the defective satellite. When the next satellite reaches position A, it is switched on, and the backup satellite is switched off. For each active satellite, the system thus provides a backup satellite which may take over the operation if the active satellite fails. Thereby, the reliability of the system can be improved.

Also schematically shown in FIG. 4 is an example for providing supporting links to the individual satellites. At a ground station 110, a plurality of directional antennas 112a, 112b, 112c is provided, i.e. antennas which concentrate the emitted radiation in a specific direction. Each directional antenna 112a, 112b, 112c establishes a supporting link 111a, 111b, 111c to one of the satellites 120. In this specific example, three directional antennas are shown, but the present invention is not limited thereto. There may also be provided more or less than 3 directional antennas, and they may be provided at different ground stations instead of the same ground station. It is to be understood that the figure only schematically shows the assignment of the antennas to the satellites and not their real position on earth which generally is at a specific point (or at specific points) of the earth surface, preferably within the state responsible for providing air traffic control to the geographic sector 102.

The directional antennas follow the position of the corresponding satellites during their flight above the equator at least during the entire period of time required for the operation of the satellite, preferably longer, for example during the entire period of their individual visibility. In the present example, the directional antennas follow the satellites at positions between D and B. If a satellite reaches the position B, the corresponding antenna is turned around to establish a link with the satellite which then has arrived at position D.

In this case, the following effects are achieved: The antenna 112a provides a supporting link 111a to a satellite between positions A and B which is the actively transmitting satellite for providing ATC to the geographic sector 102. The supporting link 111a provides relayed upwards/downwards ATC voice transmission and embedded telemonitoring and telecommand functionality (TMTC).

The antenna 112b provides a supporting link 111b to a satellite between positions C and A which is currently not active because its elongation is too large. The supporting link 111b enables the satellite to be monitored for service purposes such as for example orbit tracking, orbit correction, software upload and others. When the satellite reaches position A, it is switched active, and the supporting link 111b then provides the service indicted above for supporting link 111a.

The antenna 112c provides a supporting link 111c to a satellite between positions D and C which generally is not active, but may be switched active as a backup if the satellite between positions A and B fails. If the satellite is active, the supporting link 111c then provides the service indicted above for supporting link 111a. If it is not active, the supporting link 111c provides the service as indicted above for supporting link 111b. Since the link 111c has already been established at the time when the satellite arrived at position D, the satellite between positions D and C can be immediately activated at any time when the satellite between positions A and B fails without causing any interruption at all in the operation of the system.

By the method above in which a supporting link between a ground station and a satellite is provided for a longer period of time than the activity period of the satellite, a sufficiently long time for orbit tracking and other services such as orbit correction and/or software upload is provided.

While the explanation above has been given for a geographic sector crossing the equator, ATC may also be provided to a geographic sector which is located at a distance from the equator.

Figure 5:
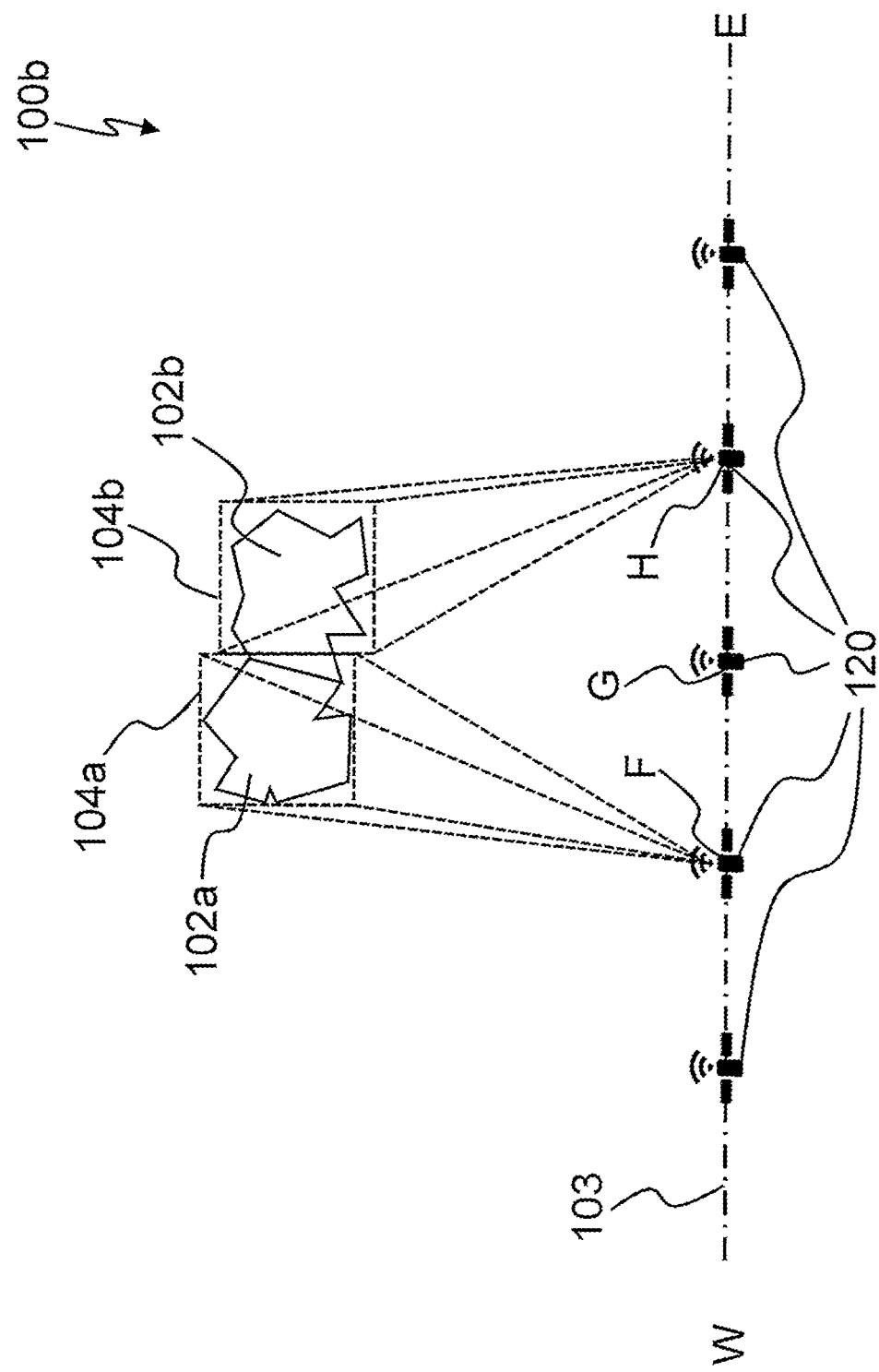
FIG. 5 shows a schematic view of an air traffic control system according to a modification of the first embodiment.

FIG. 5 shows a schematic view of another example of the air traffic control system 100b according to the first embodiment. In this specific example, two geographic sectors 102a and 102b are arranged adjacent to each other and at a sufficient distance from the equator 103 so that an elevation angle of a satellite 120 traveling above the equator 103 in the selected MEG orbit never exceeds the maximum permitted value. Therefore, the geographic sectors may also be served by a satellite which momentarily is positioned at the same longitude as the geographic sectors. In the example, the geographic sectors 102a and 102b need not be immediately be adjacent to each other, and the service regions 104a and 104b may or may not overlap each other or be spaced from each other.

Satellite positions F, G, and H shall be explained next. F is a position in which the satellite 120 is approaching the geographic sector 102a and already is near enough so that its elevation angle within the entire geographic sector 102a is greater than the minimum required value. G is a position in which the satellite 120 is at the same longitude as the geographic region 102a and/or 102b. H is a position in which the satellite 120 has already passed the geographic sector 102b and is still near enough so that its elevation angle within the entire geographic sector 102b is greater than the minimum required value.

In the present example, the satellite in position F is active for providing air traffic control to the geographic sector 102a, and the satellite in position H is active for providing air traffic control the geographic sector 102b. Since different frequencies are assigned to the geographic sectors 102a and 102b, the signals sent by the two satellites do not interfere with each other even if the service regions 104a and 104b overlap. The satellite in position G is not active, but may be used as a backup satellite if one of the adjacent satellites fails. The control of the satellites from the ground station may be carried out in a similar way as described above with reference to FIG. 4.

In the example explained above, each satellite is active (or ready to become active if another satellite fails) only over a small part of its orbit around earth. It may therefore also be used for servicing geographic sectors in other regions of the earth's surface. It may then be required to swivel the antenna of the satellite in order to be adapted to geographic sectors at different distances from the equator.

In a second embodiment, a single satellite is provided at a geostationary orbit, also called geosynchronous equatorial orbit (GEO) The geostationary orbit has an altitude above earth of about 35,786 km.

Figure 6:
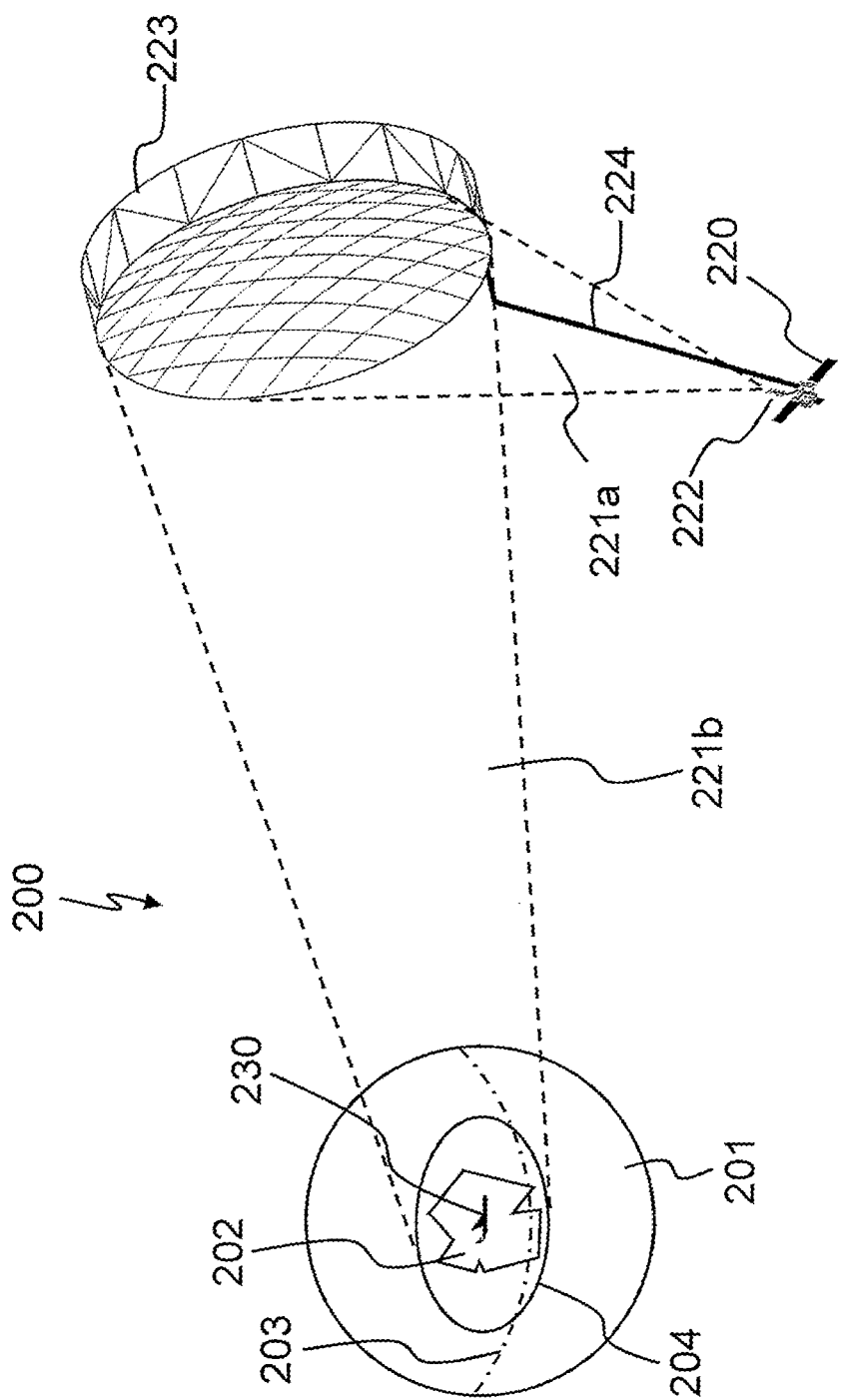
FIG. 6 shows a schematic view of an air traffic control system according to a second embodiment of the present invention.

FIG. 6 shows a schematic not-to-scale side view of an air traffic control system 200 according to the second embodiment. On the earth's surface 201, a geographic sector 202 is defined in a similar way as in the first embodiment. As a specific (non-limiting) example, the geographic sector 202 in this embodiment extends across the equator 203. A satellite 220 is in a geostationary orbit above the equator 203 so that it always has the same position (azimuth and elevation) seen from earth.

A service region 204 serviced by the satellite 220 is selected in such a way that the entire geographic sector 102 is included. The service region 204 in the present embodiment is shown as an ellipse, but the present invention is not limited thereto.

The satellite 220 comprises at least one antenna 222, 223, for establishing a communication link 221a, 221b between the satellite 220 and an aircraft 230 in the geographic sector 203, preferably a directional antenna. In the present embodiment, the directional antenna comprises an active antenna 222 for emitting an RF beam 221a in the VHF or UHF frequency range and passive reflector antenna 223 which is held at a distance from the satellite 220 by an arm 224 for reflecting and bundling the emitted RF beam 221a and directing the reflected and bundled RF beam 221b to earth. The active antenna 222 may for example be a Yagi antenna comprising an active element and a plurality of passive elements acting as reflectors and directors. The reflector antenna 223 may for example be a parabolic offset reflector antenna. Such a parabolic offset reflector antenna is an antenna having a reflector surface in the form of a sector of a paraboloid, wherein the center point of the reflector surface is not the center point of the paraboloid. Since a parabolic reflector for the VHF range is required to have a considerable size (some ten meters), a special light weight construction has to be used. The reflector antenna may for example be formed by a light weight deployable mesh which is for example known as Astro mesh.

Since a relative position of the satellite with regard to the geographic sector 202 to be serviced is fixed, and the antenna may exactly be aligned to the target area, a linear polarization of the radiation may be used which results in an advantage to the gain of 3 dB compared with circular polarization.

Since the position of the satellite 220 is fixed, the supporting link can be performed using a single antenna at a single ground station (not shown in the figure).

The satellite may be configured to emit two or more RF signals having different frequencies for providing air traffic control to two or more geographic sectors within a target area of the directional antenna.

Since only one satellite is active in this embodiment, special control for avoiding that two satellites are active on the same frequency as in the first embodiment is not required.

While the present invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

For example, in addition to the frequency assigned to the geographic sector to be serviced, each satellite additionally may be active on an aircraft emergency frequency such as the International Air Distress (IAD) at 121.5 MHz or 243 MHz.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention.

What is claimed is:

1. A system for providing air traffic control to a plurality of aircrafts within a predetermined geographic sector to which a predetermined communication frequency in a VHF or UHF range is assigned, each of the plurality of aircrafts using the same predetermined communication frequency that is assigned to the geographic sector, the system comprising a plurality of satellites configured for a communication with an aircraft in the geographic sector using an analog modulated RF signal at the same predetermined communication frequency that is assigned to the predetermined geographic sector, wherein:

the plurality of satellites move in a distance from each other in the same orbit which is a medium earth orbit or low earth orbit, a number and an altitude of the plurality of satellites is selected in such a way that at each time, at least one of the plurality of satellites has an elevation in a range between 10° and 80° for all the locations within the predetermined geographic sector, and the system is configured in such a way that:

a first one of the plurality of satellites is switched active for the communication with the plurality of aircrafts when the first one of the plurality of satellites reaches a predetermined first position relative to the predetermined geographic sector, and a second one of the plurality of satellites, which is a satellite that previously has passed the predetermined first position and was switched active for the communication with the plurality of aircrafts while at the predetermined first position, is switched off when the second one of the plurality of satellites reaches a predetermined second position relative to the predetermined geographic sector, wherein the first position and the second position are determined based on the number and altitude of the plurality of satellites in such a way that the second one of the plurality of satellites is switched off at the same time that the first of the plurality of satellites is switched active, whereby at each time, only one satellite is actively transmitting on said predetermined communication frequency that is assigned to the geographic sector.

2. The system according to claim 1, wherein the orbit is an equatorial orbit.

3. The system according to claim 1, wherein a number and an altitude of the plurality of satellites is selected in such a way that at each time, at least two of the plurality of satellites has the elevation in the range between 10° and 80° for all the locations within the predetermined geographic sector, so that one of the plurality of satellites can be used as an active satellite and the other one can be used as a backup satellite if the active satellite fails.

4. The system according to claim 1, wherein a number and an altitude of the plurality of satellites is selected in such a way that for two geographic sectors at a sufficient distance from the equator, an elevation of the satellites always is smaller than a predetermined upper limit so that the first one of the plurality of satellites may be used as an active satellite for one of the geographic sectors, the second one of the plurality of satellites may be used as an active satellite for the other one of the geographic sectors, and a third one of the plurality of satellites may be used as a backup satellite if the first one or the second one of the plurality of satellites fails.

5. The system according to claim 1, comprising at least two ground antennas following a position of at least two satellites, wherein a first supporting link between the ground antennas and an actively transmitting satellite provides relayed upwards and/or downwards ATC voice transmission, and/or a second supporting link between the ground antennas and a not actively transmitting satellite provides maintenance service.

6. The system according to claim 5, wherein the first supporting link provides embedded telemonitoring and telecommand functionality.

7. The system according to claim 5, wherein the maintenance service in the second supporting link includes orbit tracking, orbit correction, and software upload.

8. The system according to claim 1,
being configured in such a way that each satellite can be switched active more than once during one orbit around the earth in order to provide air traffic control to more than one geographic sector,
wherein each satellite is configured to swivel its antenna in order to reach geographic sectors at different distances from the equator.

9. The system according to claim 1, wherein the at least one satellite is configured to be able to operate (a) at least at the same predetermined communication frequency that is assigned to the predetermined geographic sector and at an aircraft emergency frequency or (b) at least at two different communication frequencies assigned to the same or different predetermined geographic sectors.

10. A communication method for providing air traffic control to a plurality of aircrafts within a predetermined geographic sector to which a predetermined communication frequency in the VHF or UHF range is assigned, each of the plurality of aircrafts using the same predetermined communication frequency that is assigned to the geographic sector,
wherein the method comprises establishing a communication link using an analog modulated RF signal at the same predetermined communication frequency that is assigned to the geographic sector between a plurality of satellites and the plurality of aircrafts in the geographic sector,
wherein:
the plurality of satellites move in a distance from each other in the same orbit which is a medium earth orbit or low earth orbit,
a number and an altitude of the plurality of satellites is selected in such a way that at each time, at least one of the plurality of satellites has an elevation in a range between 10° and 80° for all locations within the predetermined geographic sector,
a first one of the plurality of satellites is switched active for the communication with the plurality of aircrafts when the first one of the plurality of satellites reaches a predetermined first position relative to the predetermined geographic sector, and
a second one of the plurality of satellites, which is a satellite that previously has passed the predetermined first position and was switched active for the communication with the plurality of aircrafts while at the predetermined first position, is switched off when the second one of the plurality of satellites reaches a predetermined second position relative to the predetermined geographic sector,
the first position and the second position are determined based on the number and altitude of the plurality of satellites in such a way that the second one of the plurality of satellites is switched off at the same time that the first one of the plurality of satellites is switched active,
whereby at each time, only one satellite is actively transmitting on said predetermined communication frequency that is assigned to the geographic sector.

* * * * *